United States Patent [19]

Vanderspurt

[11] 4,052,424

[45] Oct. 4, 1977

[54] PRODUCTION OF ESTERS FROM ALCOHOLS

[75] Inventor: Thomas H. Vanderspurt, Gillette, N.J.

[73] Assignee: Celanese Corporation, New York, N.Y.

[21] Appl. No.: 719,548

[22] Filed: Sept. 1, 1976

[51] Int. Cl.² ............................ C09F 5/08; C11C 3/02
[52] U.S. Cl. ............................ 260/410; 260/410.9 R; 260/410.5; 560/240
[58] Field of Search ............... 260/410, 410.9 L, 495, 260/531 R, 410.5

[56] References Cited

U.S. PATENT DOCUMENTS

| | | | |
|---|---|---|---|
| 1,817,899 | 8/1931 | Martin et al. | 260/495 |
| 1,949,425 | 3/1934 | Lazier | 260/495 X |
| 1,964,001 | 6/1934 | Lazier | 260/495 X |
| 2,050,789 | 8/1936 | Fuchs et al. | 260/495 X |
| 3,188,330 | 6/1965 | Hecker et al. | 260/410.9 L |
| 3,739,020 | 6/1973 | McClain et al. | 260/495 X |

*Primary Examiner*—Winston A. Douglas
*Assistant Examiner*—John F. Niebling

[57] ABSTRACT

This invention provides a process for producing carboxylic esters in high yield by contacting alkanol in vapor phase with a novel silver-cadmium alloy catalyst.

9 Claims, No Drawings

PRODUCTION OF ESTERS FROM ALCOHOLS

BACKGROUND OF THE INVENTION

The Tishchenko reaction is illustrative of an early prior art method of ester synthesis. The process involves disproportionation of an aldehyde such as acetaldehyde into the corresponding ester, e.g., ethyl acetate, in the presence of an aluminum alkoxide catalyst.

U.S. Pat. No. 1,869,761 discloses a process for vapor phase conversion of alcohols to esters in the presence of a silver-uranium carbonate catalyst.

U.S. Pat. No. 1,975,853 describes a process for producing ethyl acetate by contacting ethanol in vapor phase under high pressure with a catalyst consisting of metallic copper and a difficultly reducible oxide.

U.S. Pat. No. 2,012,993 proposes the inclusion of water in a reaction mixture of an alcohol and a dehydrogenation catalyst to suppress the formation of higher alcohols and increase the production of ester derivatives.

U.S. Pat. No. 2,504,497 discloses a new type of catalyst for dehydrogenation of alcohols to esters. The catalyst consists of a porous aluminum-copper alloy composition.

U.S. Pat. No. 3,188,330 discloses a liquid phase method for converting alcohols into ketones and esters in the presence of a carboxylic acid salt of a Group IIB metal, e.g., cadmium or zinc.

U.S. Pat. No. 3,452,067 proposes the use of a supported molybdenum sulfide catalyst for dehydrogenation of alcohols to esters in the vapor phase.

U.S. Pat. No. 3,639,449 discloses a process for converting alcohols to esters by reaction with molecular oxygen in the presence of a palladium or rhodium oxide catalyst.

As evidenced by the prior art disclosure, there is a continuing effort to develop improved catalysts and methods to ameliorate the disadvantages of known processes for converting alcohols into esters. A main disadvantage is the low selectivity conversion to the desired esters, and the concomitant formation of by-products such as acids, aldehydes, higher alcohols, and gaseous derivatives.

Accordingly, it is a main object of the present invention to provide a one-step vapor phase process for converting alcohols into carboxylic esters with a high conversion rate and a high selectivity.

It is another object of the present invention to provide a novel dehydrogenation catalyst which exhibits high selectivity for vapor phase conversion of primary alkanols into alkyl alkanoates.

Other objects and advantages of the present invention shall become apparent from the following description and examples.

DESCRIPTION OF THE INVENTION

One or more objects of the present invention are accomplished by the provision of a process which comprises contacting primary alkanol in vapor phase with a silver-cadmium alloy catalyst at a temperature between about 250° C and 600° C.

The conversion of alkanol to alkyl alkanoate in vapor phase proceeds rapidly and with high selectivity either in the absence or presence of added hydrogen:

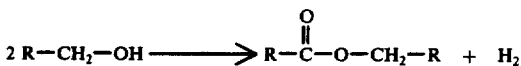

When an alkanol mixture is employed, a corresponding ester product mixture is obtained.

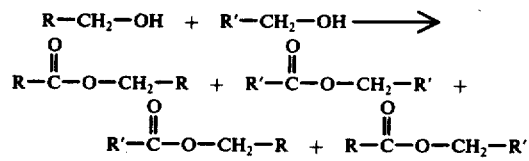

The invention process is amenable to primary alkanols which have appropriate volatility and stability under the vapor phase catalytic conditions. Suitable alkanols include those containing between 1 and 12 carbon atoms, and most preferably between 1 and about 8 carbon atoms. The alkanols can be saturated or unsaturated, straight chain or branched, cyclic or acyclic, and can contain heteroatoms which do not interfere with the chemical transformation of the primary alcohol moiety in the compounds. It is preferred to employ monohydric alcohols rather than polyhydric alcohols in order to achieve optimal results in the practice of the invention process. Illustrative of suitable primary alcohols are methanol, ethanol, propanol, allyl alcohol, butanol, isobutanol, pentanol, hexanol, 2-ethylhexanol, heptanol, octanol, decanol, dodecanol, cyclopentylmethanol, cyclohexenylmethanol, benzyl alcohol, 2-phenylethanol, and the like.

In the practice of the invention process, the alkanol is vaporized alone or in admixture with a gasiform component such as nitrogen, hydrogen, carbon monoxide, or carbon dioxide and is passed through a reaction zone containing the silver-cadmium alloy catalyst. The catalyst can be in the form of a fixed, moving, or fluidized bed. A continuous mode of operation is preferred.

The reaction zone temperature can vary in the range between about 250° C and 600° C, and preferably in the range between about 280° C and 450° C. The reaction zone pressure can vary in the range between about 5 and 2000 psia and preferably in the range between about 15 and 1200 psia.

The feed stream can contain an inert diluent such as nitrogen or helium, in a quantity which can vary broadly over the range between about 0.5 and 100 moles per mole of alkanol. If hydrogen, carbon monoxide or carbon dioxide is added to the feed stream, it is preferred that the quantity be maintained in the range between about 0.1 and 5 moles per mole of alkanol.

The hydrogen, carbon monoxide or carbon dioxide, or mixtures thereof, under some conditions tends to suppress undesirable side reactions. For example, the presence of hydrogen and carbon monoxide can reduce the conversion yield of methanol to hydrogen and carbon monoxide, and the presence of carbon dioxide can reduce the conversion yield of methyl formate to carbon dioxide and methane.

The rate at which the vapor phase gas stream is contacted with the silver-cadmium alloy or silver-cadmium-zinc alloy catalyst is not critical, and can be varied consonant with the other processing conditions to achieve an optimal balance of conversion and selectivity parameters. The flow rate of the feed stream can vary over a broad range between about 10 moles and 500 moles of gaseous alkanol per liter of catalyst per hour. Nominally, the contact time between the alkanol and the catalyst is between about 0.1 and 50 seconds.

A critical aspect of the present invention is the provision of a novel type of dehydrogenation catalyst which exhibits unique ability to convert alkanols to alkyl alkanoates in a highly selective manner. The present invention catalysts are more fully described in copending patent application Ser. No. 714,201, filed Aug. 13, 1976, and copending patent application Ser. No. 714,057, filed Aug. 13, 1976, incorporated herein by reference.

The preferred type of dehydrogenation catalyst consists essentiallay of a silver-cadmium alloy or a silver-cadmium-zinc alloy on a carrier substrate, wherein the atomic ratio of silver to cadmium in the alloy is in the range of between about 0.1 and 3 to 1.

The carrier substrate can be selected from silica, Celite, diatomaceous earth, kieselguhr, alumina, silica-alumina, titanium oxide, pumice, carborundum, boria, and the like. It is highly preferred that the silver-cadmium alloy be supported on a silica and/or alumina carrier substrate. The quantity of carrier substrate in the catalyst composition can vary in the range of between about 5 and 99.5 weight percent, based on the total catalyst weight.

The preferred catalysts are prepared by coprecipitating hydroxides of silver and cadmium from an aqueous solution of calculated quantities of water-soluble salts of silver and cadmium. The precipitation is effected by the addition of caustic to the aqueous solution.

The carrier substrate component of the catalyst composition can be incorporated during the catalyst preparation by slurrying the finely divided carrier substrate mass in the said aqueous medium immediately after the silver-cadmium hydroxides are precipitated. Finely divided porous materials such as fumed silica or diatomaceous earth are highly preferred carrier substrate materials for the preparation of the present invention catalysts.

After the coprecipitation of silver-cadmium hydroxides has been accomplished, the solids phase is recovered by filtration or other conventional means. The filtered solids are washed with chloride-free water until essentially neutral. For the purposes of a fixed bed operation, the dried filter cake preparation is calcined at a temperature between about 175° C and 300° C for a period of about 2 to 20 hours or longer, and then the calcined material is ground and pelleted. Prior to use the catalyst pellets can be reduced in a stream of hydrogen at a temperature between about 50° C and 325° C for a period of about 5 hours. For a fluidized bed operation, the calcined catalyst preparation can be ground and sized in a conventional manner to satisfy process design requirements.

There are several critical aspects of catalyst preparation which must be respected in order to achieve a novel type of hydrogenation catalyst having unique and advantageous properties in comparison to prior art catalysts for selective conversion of alkanols to alkyl alkanoates.

Firstly, the silver-cadmium alloy in the catalyst must contain an atomic ratio of silver to cadmium in the range between about 0.1 and 3 to 1, and preferably between about 0.4 and 2.2 to 1.

Secondly, the silver and cadmium in the catalyst must be in the free metal state, and must be substantially in the form of an alloy, i.e., X-ray diffraction spectra should confirm the absence of unalloyed silver or cadmium crystals, or zinc or zinc oxide crystals if zinc is present. Preferred silver-cadmium alloy catalysts are solid solutions which nominally exhibit an X-ray diffraction pattern which is substantially free of detectable unalloyed metal crystallite lines.

In terms of X-ray diffraction data as more fully described hereinbelow, a preferred silver-cadmium alloy catalyst can consist substantially of α-phase silver-cadmium, without detectable splitting of X-ray diffractin lines which is indicative of silver-rich and/or cadmium-rich α-phase crystallites. Silver-cadmium catalysts which also have outstanding selectivity for high yield conversion of alcohols into esters are those in which the alloy composition consists of more than about 50 percent of γ-phase silver-cadmium crystallites as characterized by X-ray diffraction pattern. Another preferred silver-cadmium alloy catalyst can have α,γ and ε-phase crystallites present. Those especially rich in ε-phase, while very highly selective, are somewhat less active than those richer in nonsplit α-phase alloy.

Thirdly, it has been found that the production of silver-cadmium alloy catalysts, which exhibit the greatest selectivity for converting alcohols into esters, can be achieved if the coprecipitation step of the catalyst preparation is conducted within restricted limitations and under controlled conditions. Thus, the total concentration of the water-soluble salts (e.g., nitrate salts) in the aqueous solution should be maintained in the range between about 5 weight percent and the solubility limit of the salts, and the quantity of caustic added as a precipitating agent should approximate the stoichiometric amount within narrow limits. It is particularly advantageous to employ a water-soluble hydroxide (e.g., an alkali metal hydroxide) as the caustic precipitating agent, and to add the caustic rapidly with vigorous stirring to facilitate formation of a precipitate of fine crystals or gel.

Other precautions must be observed during catalyst preparation if highly selective silver-cadmium alloy compositions are to be achieved. It has been found that the calcination step of the catalyst preparation most advantageously must be conducted within narrowly controlled limitations. The calcination step should be accomplished at a temperature between about 175° C and 300° C, and most preferably at a temperature between 200° C and 250° C. If calcination of a silver-cadmium alloy catalyst is conducted at a temperature above about 300° C, the resultant catalyst exhibits less selectivity for high yield conversion of alcohols to esters in a vapor phase process. High calcination temperatures can have the effect of segregating the active metal species into large crystallites of substantially unalloyed silver and substantially unalloyed cadmium. The presence of unalloyed silver and/or cadmium is detrimental to the hydrogenation selectivity characteristics of silver-cadmium catalysts.

It has also been found that the silver-cadmium alloy catalysts of the present invention are most effective when supported on a carrier substrate, i.e., in combination with an internal diluent.

The desired supported silver-cadmium alloy catalysts can also be achieved by introducing a calculated quantity of silver and cadmium complexes or salts in solution into the pores of a support such as silica or controlled pore size glass. The amount of each and the total concentration is adjusted so as to achieve the desired metal ratio and total percent by weight alloy. The solvent is then removed in a manner conducive to the intimate co-deposition of the silver and cadmium complexes or salts on the interior surfaces of the pores. In the case of aqueous silver acid cadmium nitrate solutions in silica, exposure of the support and adsorbed solution at room temperature under about 100 Torr helium to a liquid nitrogen cooled vapor trap for about 48 hours is a convenient procedure. After solvent removal, alternate degassing and reducing conditions are imposed by exposure at elevated temperatures to a vacuum alternated with a low pressure stream of a reducing gas such as hydrogen, synthesis gas, carbon monoxide or hydrazine. The catalyst is then allowed to cool under at least one atmosphere of hydrogen. X-ray diffraction is conveniently employed to verify that alloy formation is complete. Catalysts prepared in this manner are not subjected to conventional air calcination conditions. The catalysts are stored in a relatively oxygen-free environment until usage.

The corresponding silver-cadmium-zinc alloy catalysts are prepared in the same manner as described hereinabove for the silver-cadmium alloy catalysts. The silver-cadmium-zinc alloy catalysts contain between about 0.001 and 30 weight percent zinc, based on the total weight of alloy.

The low molecular weight esters produced by the present invention process are useful as solvents and as raw materials for carboxylic acid production. The high molecular weight esters are useful as solvents and as intermediates in the preparation of synthetic polymers.

The following examples are further illustrative of the present invention. The reactants and catalysts and other specific ingredients are presented as being typical, and various modifications can be derived in view of the foregoing disclosure within the scope of the invention.

EXAMPLE I 29.73 Grams AgNO$_3$ (0.175 mole), 23.14 grams Cd(NO$_3$)$_2$·4H$_2$O (0.075 mole), 14.87 grams Zn(NO$_3$)$_2$·6H$_2$O (0.050 mole) were dissolved in 160 mls doubly distilled water. 27.3 grams 87.4% analytical reagent grade KOH (0.425 mole) were dissolved in 160 mls of doubly distilled water. Both solutions were simultaneously, in a rapid dropwise fashion, added to 200 mls of vigorously stirred doubly distilled water. Additional water was then added to bring the volume to 1000 mls and stirring was continued for 1 hour. 500 mls of Cab-O-Sil M-5 were then added, along with sufficient additional water to maintain fluidity. The final volume was adjusted to 2000 mls by addition of doubly distilled water and the mixture was stirred at room temperature for 2 more hours. The precipitate was separated from the supernatant KNO$_3$ solution by vacuum filtration and washed with 2000 mls of doubly distilled water. After partially air drying for 18 hours still in the funnel, it was removed and placed in an oven and calcined in air at 250° C for 20 hours. On cooling to room temperature in a vacuum desiccator, it was crushed and sieved to yield a 50–80 mesh fraction. On bulk analysis this material contained 39.9%, SiO$_2$, 35.8% Ag, 13.3% Cd, 5.3% Zn, and 0.3% K. On powder X-ray diffraction examination, weak sharp lines were seen at 2.35, 20.4, 1.44 and 1.23 A, with a very weak but sharp back reflection pattern; from this it was deduced that CdO and Ag crystallites were present, zinc species were not identified as such.

3.13 Grams, 6.8 mls of the 50 to 80 mesh fraction of the catalyst precursor was loaded into a 0.55 cm I.D. by 28 cm long 316 stainless steel reactor tube. Under 10 psig 99.995% hydrogen flowing at 250 SCCM, the temperature was increased from 22° C to 300° C over the course of 5 hours, maintained at 300° C for 2 hours, and then allowed to cool to 22° C. Table I describes the various reactants, reactor conditions and results for vapor phase conversion of methanol.

The used catalyst on powder X-ray diffraction examination had broad lines at 2.36, 2.04, 1.44 and 1.23 A, with a very weak back reflection pattern. This, in light of the bulk analytical data, indicated the presence of a 65.8% Ag, 24.4% Cd, 9.7% Zn alloy on the silica.

Table I

| | | | | % Molar Selectivity Carbon Basis | | | | | | Methyl |
|---|---|---|---|---|---|---|---|---|---|---|
| Carrier Gas | Catalyst Temp. °C | Contact Time sec. | % CH$_3$OH Conversion | Methyl Formate | Dimethyl Ether | Formaldehyde | CO$_2$ | CO | CH$_4$ | Formate STY g/l/hr |
| N$_2$ | 359 | 0.32 | 20.6 | 83 | <0.5 | 0 | 4.5 | 7.9 | 4.5 | 501 |
| H$_2$ | 359 | 0.36 | 7.4 | 86.6 | <0.5 | 0 | 4.9 | 3.6 | 4.9 | 256 |

EXAMPLE II 4.8 Grams, 11.5 mls of 50 to 80 mesh fraction of the catalyst precursor of EXAMPLE I was loaded into a 0.924 cm I.D. by 28 cm long 316 stainless steel reactor tube. Under 10 psig 99.995% hydrogen flowing at 250 SCCM, the temperature was increased from 22° C to 300° C over the course of 5 hours, maintained at 300° C for 2 hours, and then allowed to cool to 22° C. Table II describes the reactants, reactor conditions and results for vapor phase conversion of n-propanol. Similar results are obtained when n-butanol is subjected to the same reaction conditions.

Table II

| | | | | % Molar Selectivity Carbon Basis | | | | |
|---|---|---|---|---|---|---|---|---|
| Carrier Gas | Catalyst Temp. °C | Contact Time sec. | % n-CH—OH Conversion | n-Propyl Propionate | Pro-panal | Other Products | n-Propyl Propionate STY g/l/hr |
| H$_2$ | 290 | 7.7 | 63.4 | 60.3 | 26.5 | 13.2 | 356 |

EXAMPLE III

To a solution of silver and cadmium nitrates made by adding 102.0 grams AgNO$_3$ (0.600 mole) and 138.92 Cd(NO$_3$)$_2$·2H$_2$O (0.450 mole) to 150 mls doubly distilled water, a solution of 60.9 grams of 98.6% analytical reagent grade NaOH in 150 mls of doubly distilled water was added with rapid stirring. The resultant black gel turned light brown on suspending in an additional 1500 mls of doubly distilled water. The precipitate was then separated from the solution by vacuum filtration, washed with 2000 mls of doubly distilled water, and then ground in a mortar and pestle with 150 mls of DuPont Ludox AS Colloidal Silica. This mixture was then dried for 20 hours at 95° C. The solid was then calcined in air at 200° C for 60 hours, cooled in a vacuum desiccator, and crushed and screened to yield a 50-80 mesh fraction. This material contained 18.8% $SiO_2$, 27.2% Ag and 30.6% Cd. CdO, $Cd(OH)_2$ and Ag, all of medium order, were detected by powder X-ray diffraction.

13.10 Grams, 14.6 mls, of this material were placed in a 0.925 cm I.D. reactor tube 28 cm long. Under 10 psig 99.995% hydrogen flowing at 250 SCCM in the manner of the previous Examples, the temperature was increased from 22° C to 300° C over the course of 5 hours, and maintained at 300° C for 2 hours before slow cooling to room temperature.

When a n-propanol/hydrogen (1:1) vapor phase mixture was contacted with the catalyst, the results described in Table III were obtained.

The used catalyst with a nitrogen BET surface area of 9.6 m²/grams contained primarily $\gamma$ AgCd with $\alpha$ and some $\epsilon$ AgCd alloy all on silica. The average composition of the AgCd alloy was, by bulk analysis, 54.9% Ag and 45.1% Cd.

Table III

| | | | n-Propanol Conversion | | | | |
|---|---|---|---|---|---|---|---|
| | | | | % Molar Selectivity Carbon Basis | | | |
| Reactor Pressure psig | Catalyst Temp. °C | Contact Time sec. | n-Propanol Conversion | Propanal | n-Propyl Propionate | Other Products | n-Propyl Propionate STY g/l/hr |
| 10 | 29 | 8.9 | 47 | 68 | 29 | 3 | 116 |

What is claimed is:

1. A process for producing alkyl alkanoate esters which comprises contacting primary alkanol in vapor phase with a silver-cadmium alloy catalyst at a temperature between about 250° C and 600° C, wherein the atomic ratio of silver to cadmium in the alloy is in the range of between about 0.1 and 3 to 1.

2. A process in accordance with claim 1, wherein the primary alkanol contains between 1 and about 8 carbon atoms.

3. A process in accordance with claim 1, wherein a primary alkanol mixture is employed.

4. A process in accordance with claim 1, wherein the catalyst consists essentially of the silver-cadmium alloy on a carrier substrate.

5. A process in accordance with claim 4, wherein the quantity of carrier substrate in the catalyst is in the range between about 5 and 99.5 weight percent based on the total catalyst weight.

6. A process in accordance with claim 4, wherein the carrier substrate is alumina.

7. A process in accordance with claim 4, wherein the carrier substrate is silica.

8. A process for producing alkyl alkanoate esters which comprises contacting primary alkanol in vapor phase with a silver-cadmium-zinc alloy catalyst at a temperature between about 250° C and 600° C, wherein the atomic ratio of silver to cadmium in the alloy is in the range of between about 0.1 and 3 to 1, and the zinc is contained in the alloy in a quantity between about 0.001 and 30 weight percent based on the total weight of alloy.

9. A process in accordance with claim 8, wherein the catalyst consists essentially of the silver-cadmium-zinc alloy on a carrier substrate.

* * * * *